L. Holmes,
Meat-Broiler.
№ 75,914.  Patented Mar. 24, 1868.
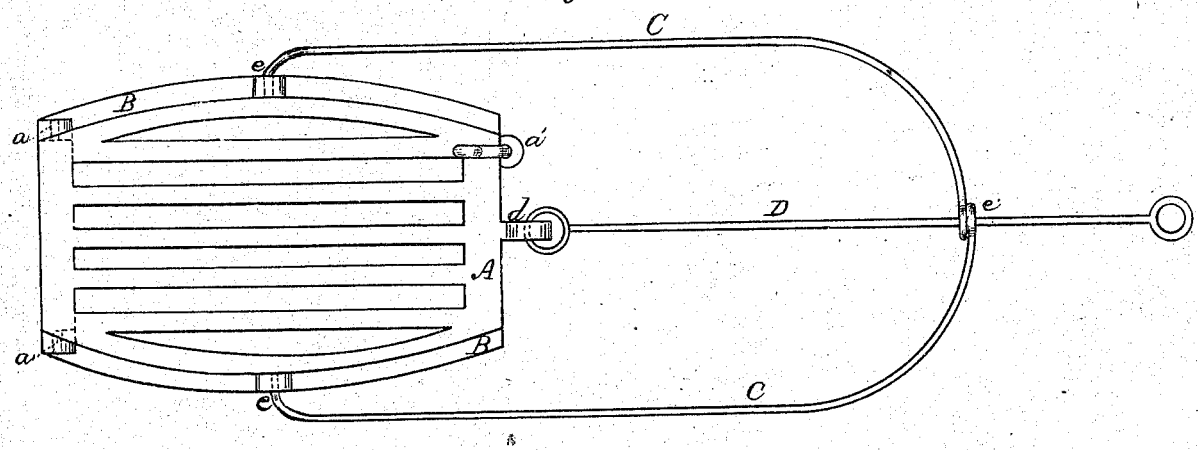
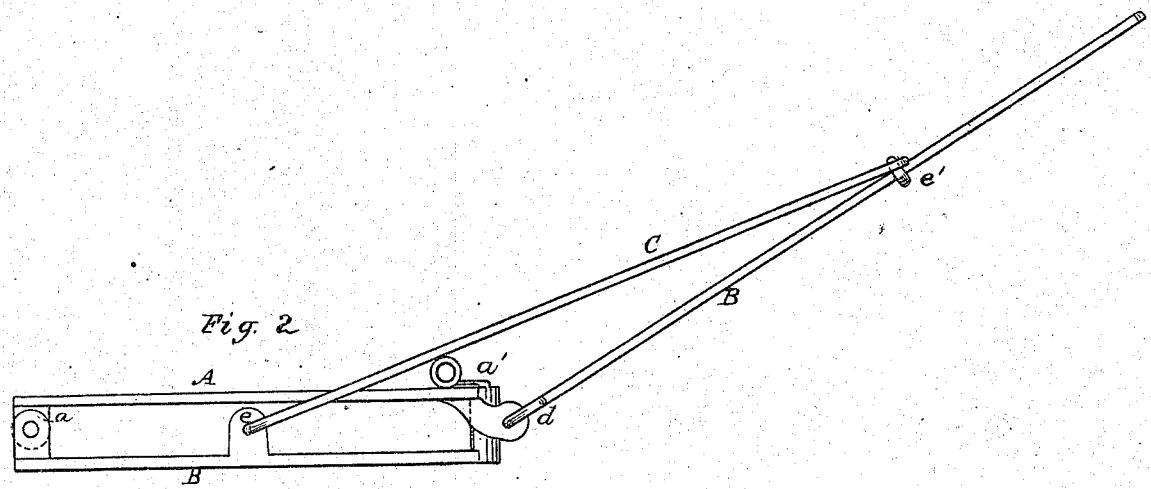
Witnesses
H. C. Ashkettle
Theo Tasche
Inventor
L. Holmes
per Munn &
Attorneys

United States Patent Office.

LEWIS HOLMES, OF KEENE, NEW HAMPSHIRE.

Letters Patent No. 75,914, dated March 24, 1868.

---

MEAT-BROILER.

---

The Schedule referred to in these Letters Patent and making part of the same.

---

TO ALL WHOM IT MAY CONCERN:

Be it known that I, LEWIS HOLMES, of Keene, in the county of Cheshire, and State of New Hampshire, have invented a new and improved Meat-Broiler; and I do hereby declare that the following is a full, clear, and exact description thereof, which will enable those skilled in the art to make and use the same, reference being had to the accompanying drawings, forming part of this specification.

This invention relates to a new and improved method of constructing broilers for the broiling of meat, whereby the same is more quickly done, without the escaping of unpleasant odors into the room.

It consists in the broiler being made in two parts hinged together at one end, and secured at the other end by a button, the whole being pivoted to and supported by a bail, within the bend of which the same rotates, whereby the same may be easily turned over, a handle passing through an eye in said bail, being pivoted to one end of one of the parts of the broiler, by means of which the same is operated. In the accompanying plate of drawings—

Figure 1 is a plan view of my invention.
Figure 2 is a side view of the same.
Similar letters of reference indicate corresponding parts.

A is one part of the broiler; B is the other part; $a$ is a hinge, by means of which the parts A and B are hinged together; $a'$ is a button; C is the bail; $e$ are ears or projections on the part B, to which the bail C is pivoted; $e'$ is an eye in the bail C; D is the handle; $d$ is an eye or projection in the part A, to which the handle D is pivoted. The parts A and B are made of cast iron, in the same general form, and are provided with parallel longitudinal bars, as shown in the drawing, in like manner as the gridiron or broilers now commonly in use, and may be of any convenient length and width, so as easily to pass through the holes or openings in the top of cooking-stoves and ranges. The parts A and B are hinged together at one end, by the hinge $a$, at such distance apart as to receive, and contain between the same, any meat, as the same is ordinarily cut for broiling. To the part B, at the end of the same opposite to the hinge $a$, and pivoted in a suitable projection for that purpose, is a rotating button, $a'$. Said button $a'$ may be made of wire bent in such form, as shown, as to lie over upon the part A, whereby the parts A and B are held together, and upon any meat contained between the same. Upon each side of the part B, is a projection or ear, $e$, being part of the part B, or rigidly secured thereto, to which the bail C is pivoted, as shown. The bail C is made of wire, so bent as to permit the broiler to rotate upon the pivot $e$ within the bend of the same; the object of the bail C being to form a convenient means of holding the broiler, or moving the same from the fire. To the same end of the part A as the button $a'$, is pivoted, in the middle of the same, the handle D, upon a projection, $d$, cast on the part A to receive the same. The handle D is made of wire, and is of sufficient length to extend through an eye, $e'$, formed in the bail C, as shown, and beyond the same, so as to be of sufficient length to permit the broiler to be turned over without the same being drawn out from the eye $e$, and so as to form a convenient handle, by means of which the two parts A and B may be opened or separated.

The broiler is used through the boiler-holes in the top of an ordinary stove, and is dropped down so as to rest directly upon the fire, the bail C and rod D occupying a vertical position, extending through said holes, and held in place by the stove-cover or griddle. In this position the stove-cover will very nearly cover the boiler-hole. The juices are preserved in the meat by suddenly searing it over very hot coals in the stove. This closes the pores of the meat, and prevents the escape of said juices.

The operation is readily seen from the drawing and the above description.

Constructed as above described, it constitutes a convenient broiler for the broiling of meat, the advantage of which is that the same may be contained wholly within the range or stove, and so covered with the covers of the same, as to prevent the rising, in the room, of unpleasant odors.

Having thus described my invention, I claim as new, and desire to secure by Letters Patent—

A broiler for broiling meat, and for all the purposes for which broilers are used, composed of the parts A and B hinged together, the whole rotating within the bend of a coil, C, and operated by a handle, D, substantially as shown and described, and for the purposes set forth.

The above specification of my invention signed by me, this 11th day of December, 1867.

LEWIS HOLMES.

Witnesses:
　WM. F. McNAMARA,
　ALEX. F. ROBERTS.